(12) United States Patent
Boken

(10) Patent No.: US 9,959,738 B2
(45) Date of Patent: May 1, 2018

(54) RECIPROCATING MACHINERY MONITORING SYSTEM AND METHOD

(71) Applicant: CENTEGA, LLC, Wilmington, DE (US)

(72) Inventor: Michael Boken, Bogota (CO)

(73) Assignee: Centega Services, LLC, Pittsburgh, PA (US)

( * ) Notice: Subject to any disclaimer, the term of this patent is extended or adjusted under 35 U.S.C. 154(b) by 0 days. days.

(21) Appl. No.: 14/779,430

(22) PCT Filed: Apr. 8, 2014

(86) PCT No.: PCT/US2014/033311
§ 371 (c)(1),
(2) Date: Sep. 23, 2015

(87) PCT Pub. No.: WO2014/168937
PCT Pub. Date: Oct. 16, 2014

(65) Prior Publication Data
US 2016/0055737 A1 Feb. 25, 2016

Related U.S. Application Data

(60) Provisional application No. 61/809,781, filed on Apr. 8, 2013.

(51) Int. Cl.
G06F 7/00 (2006.01)
F02D 9/08 (2006.01)
(Continued)

(52) U.S. Cl.
CPC ......... *G08B 21/187* (2013.01); *F02D 31/001* (2013.01); *F02D 35/0007* (2013.01);
(Continued)

(58) Field of Classification Search
CPC .... G08B 21/187; G01L 23/227; F02D 31/001
See application file for complete search history.

(56) References Cited

U.S. PATENT DOCUMENTS 5,115,778 A * 5/1992 Holroyd ................. F02P 5/152
123/406.2
7,403,850 B1 * 7/2008 Boutin .................. G01M 15/05
701/107

(Continued)

*Primary Examiner* — Joseph Feild
*Assistant Examiner* — John Mortell
(74) *Attorney, Agent, or Firm* — The Webb Law Firm

(57) ABSTRACT

A method and system for monitoring at least one reciprocating machine having a crankshaft and at least one cylinder, comprising providing at least one sensor for monitoring the at least one cylinder, the sensor being in communication with at least one processor configured to measure at least one signal from the at least one sensor and to thereby determine an angular position of the crankshaft; selecting at least one subset of potential crankshaft angular positions; calculating at least one statistic associated with the at least one subset of possible crankshaft angular positions based at least partially on data from the at least one sensor; and automatically providing a user with at least one warning or automatically shutting down the machine if the at least one statistic exceeds at least one predetermined threshold; wherein, the at least one sensor comprises at least one acoustic emission sensor.

20 Claims, 11 Drawing Sheets

(51) Int. Cl.

| | | |
|---|---|---|
| *G01M 15/11* | (2006.01) | |
| *G06F 19/00* | (2018.01) | |
| *G08B 21/18* | (2006.01) | |
| *G01L 23/22* | (2006.01) | |
| *F02D 41/22* | (2006.01) | |
| *F02D 41/28* | (2006.01) | |
| *F02D 31/00* | (2006.01) | |
| *F02D 35/00* | (2006.01) | |
| *F04B 19/22* | (2006.01) | |
| *F04B 37/00* | (2006.01) | |
| *F04B 39/00* | (2006.01) | |
| *F04B 39/12* | (2006.01) | |
| *F04B 49/10* | (2006.01) | |
| *F04B 51/00* | (2006.01) | |
| *F04B 53/00* | (2006.01) | |
| *F04B 53/14* | (2006.01) | |
| *F04B 53/16* | (2006.01) | |
| *F02D 35/02* | (2006.01) | |
| *F02D 41/00* | (2006.01) | |

(52) U.S. Cl.
CPC ............ *F02D 41/22* (2013.01); *F02D 41/28* (2013.01); *F04B 19/22* (2013.01); *F04B 37/00* (2013.01); *F04B 39/0094* (2013.01); *F04B 39/12* (2013.01); *F04B 49/10* (2013.01); *F04B 51/00* (2013.01); *F04B 53/006* (2013.01); *F04B 53/14* (2013.01); *F04B 53/16* (2013.01); *G01L 23/221* (2013.01); *G01L 23/227* (2013.01); *F02D 35/023* (2013.01); *F02D 35/025* (2013.01); *F02D 35/027* (2013.01); *F02D 41/009* (2013.01); *F02D 2041/228* (2013.01); *F02D 2041/286* (2013.01); *F02D 2200/021* (2013.01); *Y02T 10/40* (2013.01)

(56) References Cited

U.S. PATENT DOCUMENTS

| | | | |
|---|---|---|---|
| 2003/0093203 A1* | 5/2003 | Adachi | E02F 9/2045 701/50 |
| 2004/0244773 A1* | 12/2004 | Nakamura | F02D 9/10 123/403 |
| 2006/0129303 A1* | 6/2006 | Sauler | G01L 23/225 701/111 |
| 2006/0150932 A1* | 7/2006 | Naber | F01L 9/04 123/90.11 |
| 2008/0033629 A1 | 2/2008 | Remelman | |
| 2011/0224922 A1 | 9/2011 | Kirillov et al. | |
| 2012/0103307 A1 | 5/2012 | Javaherian et al. | |
| 2013/0030873 A1 | 1/2013 | Davidson | |
| 2016/0146704 A1* | 5/2016 | Ejakov | G01M 15/11 701/111 |

* cited by examiner

FIG. 8a
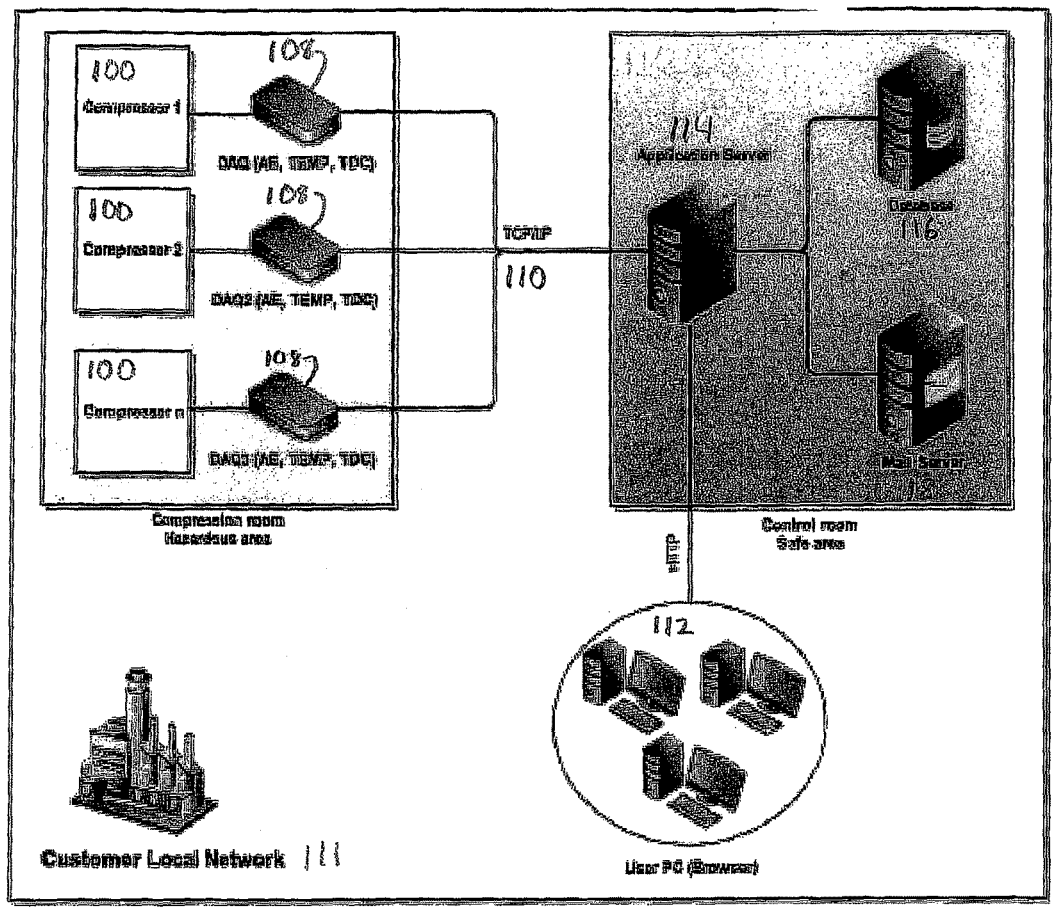
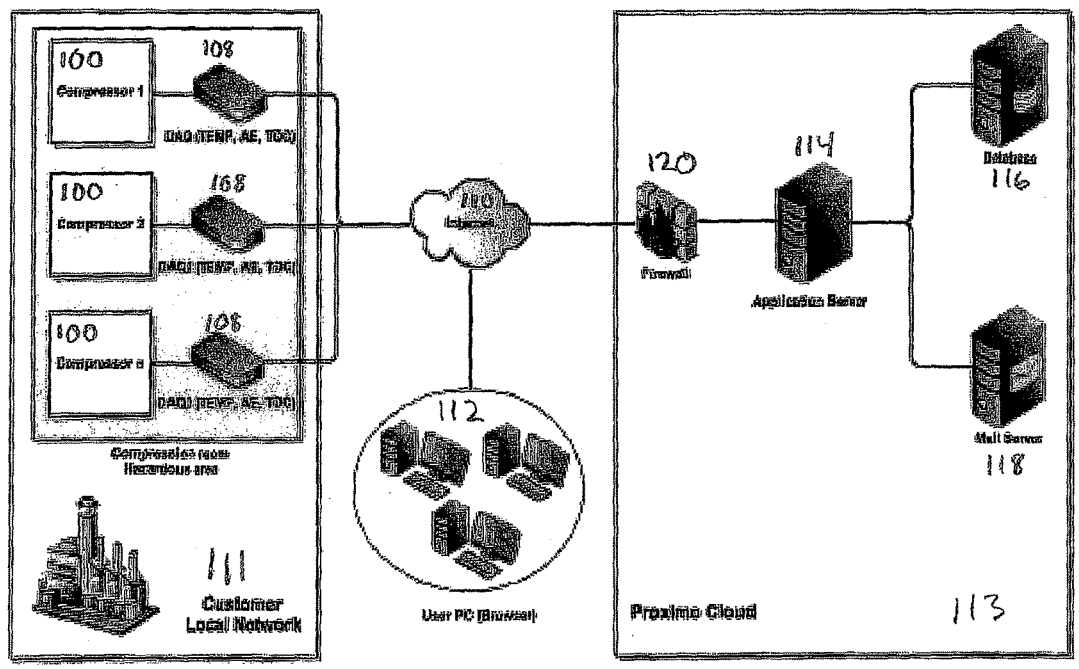
FIG. 8b

RECIPROCATING MACHINERY MONITORING SYSTEM AND METHOD

CROSS REFERENCE TO RELATED APPLICATIONS

This Application claims the priority of U.S. Provisional Patent Application No. 61/809,781, filed Apr. 8, 2013, which is incorporated by reference herein in its entirety.

BACKGROUND OF THE INVENTION

Field of the Invention

The present invention relates to diagnostic systems for reciprocating machinery. More specifically, the present invention relates to monitoring systems for reciprocating compressors used in the transportation of gasses and/or liquids.

Description of Related Art

Large internal combustion engines are frequently used to drive multi-cylinder compressors and other reciprocating machines used in the transportation of fluids such as natural gas, oil, various other fossil fuels, or industrial chemicals. Particularly in the natural gas industry, large fleets of such multi-cylinder engine compressor sets may be spread out among a substantial number of wells.

Many such industries do not employ maintenance engineers full-time, as this can be costly, and the downside of this is that when a compressor failure occurs, an unscheduled shutdown is required until a maintenance engineer resolves the issue. This can lead to long downtimes, as appointments need to be scheduled and parts may need to be ordered, and in many cases this disturbs the flow of production. Unscheduled shut-downs can be drastically reduced if reciprocating machine faults are identified before a failure occurs.

Additionally, identifying and warning operators of reciprocating machinery anomalies can be a valuable tool to increase machine life. Particularly, warning operators of such problems can help to maintain high availability, reduce operating costs, and optimize capital expenditure with regard to reciprocating machinery. However, especially in fields that utilize large fleets of reciprocating machinery, plant managers and engineers responsible for compressors operating at their facilities often receive large amounts of data that is difficult to manage.

While there are a number of monitoring systems available to the compressor industry, they are generally costly to install and maintain or require specialist manpower to collect, process, and analyze data. Further, many of these monitoring systems do not include specific enough data analysis such that an experienced engineer is able to understand the nature of the fault that is likely to occur in addition to the possible future presence of a fault in general.

SUMMARY OF THE INVENTION

In order to address the aforementioned issues, a method is provided for monitoring at least one reciprocating machine having a crankshaft and at least one cylinder. In accordance with the method, one or more sensors is provided for monitoring the machine, and the sensors are in communication with at least one processor configured to measure at least one signal from the sensor or sensors and to thereby determine an angular position of the crankshaft.

Preferably, the at least one sensor comprises at least one acoustic emission sensor. An acoustic emission sensor is also known in the art as an ultrasonic sensor. In some preferred non-limiting embodiments, the at least one sensor may further comprise a magnetic pickup sensor, an accelerometer, a temperature sensor, a pressure sensor, or any combination thereof. The accelerometer is also known as a vibration sensor, and may be configured to provide the system with a vibration signal.

The statistic may include, but is not limited to a peak value, a peak-to-peak value, a root mean square value, or any combination thereof, of an acoustic emission or vibration signal associated with the at least one subset of potential crankshaft angular positions.

In a preferred, non-limiting embodiment, a plurality of segments of potential crankshaft angular positions are identified at regular intervals from 0 to 360 degrees, and the at least one subset of potential crankshaft angular positions is made up of one or more of these identified segments. Further, the at least one warning may provide an indication as to which of the plurality of identified segments wherein the at least one threshold has been exceeded.

In a preferred, non-limiting embodiment, the least one threshold is determined by finding a baseline signal for the at least one subset of potential crankshaft angular positions by measuring the at least one signal when the machine is known to be operating normally and conducting statistical analysis to determine whether the at least one signal is significantly different than the baseline signal.

In a further preferred, non-limiting embodiment, the at least one predetermined threshold comprises a plurality of thresholds, and the at least one warning comprises a plurality of different warnings associated with each of the predetermined thresholds. Additionally, the warning may be displayed on a computer or mobile device having a user interface, wherein each of the plurality of thresholds is assigned a color, and the at least one warning may comprise changing a color of an indicator on the user interface to the color associated with the most significant of the plurality of thresholds that has been exceeded.

Additionally, the at least one sensor may comprise a plurality of sensors, each sensor being attached to the machine and associated with one of a plurality of cylinders of the machine, and the at least one processor may be further configured to indicate which of the plurality of cylinders wherein a threshold has been exceeded.

Further, the at least one reciprocating machine may comprise a plurality of machines at remote locations, and the at least one processor may be further configured to indicate in which of the plurality of machines wherein a threshold has been exceeded. At least two of the plurality of machines may comprise geographic information systems, the warning may be communicated via at least one network to at least one computer or mobile device having a user interface, and the user may be provided with an indication as to the location of the reciprocating machine wherein a threshold has been exceeded.

In an additional aspect of the present invention, a system is provided for monitoring at least one reciprocating machine having a crankshaft and at least one cylinder. The system may comprise one or more sensors for monitoring the machine, each sensor associated with one of the cylinders and in communication with at least one processor configured to measure a plurality of signals from the sensors and to thereby determine an angular position of the crankshaft.

The system further comprises one or more computers configured to, either automatically or in response to a user command, select at least one subset of potential crankshaft angular positions, calculate at least one statistic associated with the subset of possible crankshaft angular positions based at least partially on data from the sensors, and provide the user with one or more warnings or automatically shut down the machine if the statistic exceeds a predetermined threshold.

The sensor or sensors may include an acoustic emission sensor, a magnetic pickup sensor, an accelerometer, a temperature sensor, a pressure sensor, or any combination thereof. Further, the above-described statistic may include a peak value, a peak to peak value, a root mean square value, or any combination thereof of an acoustic emission or vibration signal associated with the subset of potential crankshaft angular positions.

Additionally, the computer may be further configured to identify a plurality of segments of potential crankshaft angular positions at regular intervals from 0 to 360 degrees, and the at least one subset of potential crankshaft angular positions may consist of one or more of the identified segments.

The above-mentioned warning may comprise an indication as to in which of the plurality of identified segments the at least one threshold has been exceeded. Further, the at least one threshold may be determined by: determining a baseline signal for the at least one subset of potential crankshaft angular positions by measuring the at least one signal when the machine is known to be operating normally and conducting statistical analysis to determine whether the at least one signal is significantly different than the baseline signal.

The at least one predetermined threshold may comprise a plurality of thresholds, and the at least one warning may comprise a plurality of different warnings associated with each of the predetermined thresholds.

The computer may be further configured to display the at least one warning on a user interface, wherein each of the plurality of thresholds is assigned a color, and the at least one warning comprises changing a color of an indicator on the user interface to the color associated with the most significant of the plurality of thresholds that has been exceeded.

Additionally, the at least one sensor may comprise a plurality of sensors for monitoring the machine, each sensor being associated with one of a plurality of cylinders of the machine, and the at least one processor may be further configured to indicate which of the plurality of cylinders wherein a threshold has been exceeded.

Further, the at least one reciprocating machine may comprise a plurality of machines at remote locations, and the at least one processor may be further configured to indicate in which of the plurality of machines wherein a threshold has been exceeded.

At least two of the plurality of machines may comprise geographic information systems, and the warning may be communicated via at least one network to at least one computer or mobile device having a user interface, and the user may be provided with an indication as to the location of the reciprocating machine wherein a threshold has been exceeded.

At least one subset of potential crankshaft angular positions is selected, and at least one statistic associated with the subset of possible crankshaft angular positions is calculated based at least partially on the data from the sensors. The user may be provided with at least one warning or the machine may be automatically shut down if the statistic exceeds at least one predetermined threshold.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 8a shows a network diagram in a non-limiting embodiment of the present invention wherein the data from the compressors is managed entirely on a customer local network.

FIG. 8b shows a network diagram in an alternative non-limiting embodiment of the present invention wherein the data from the compressors is communicated via the internet and partially managed in a cloud-based system.

DESCRIPTION OF THE INVENTION

Figure 1:
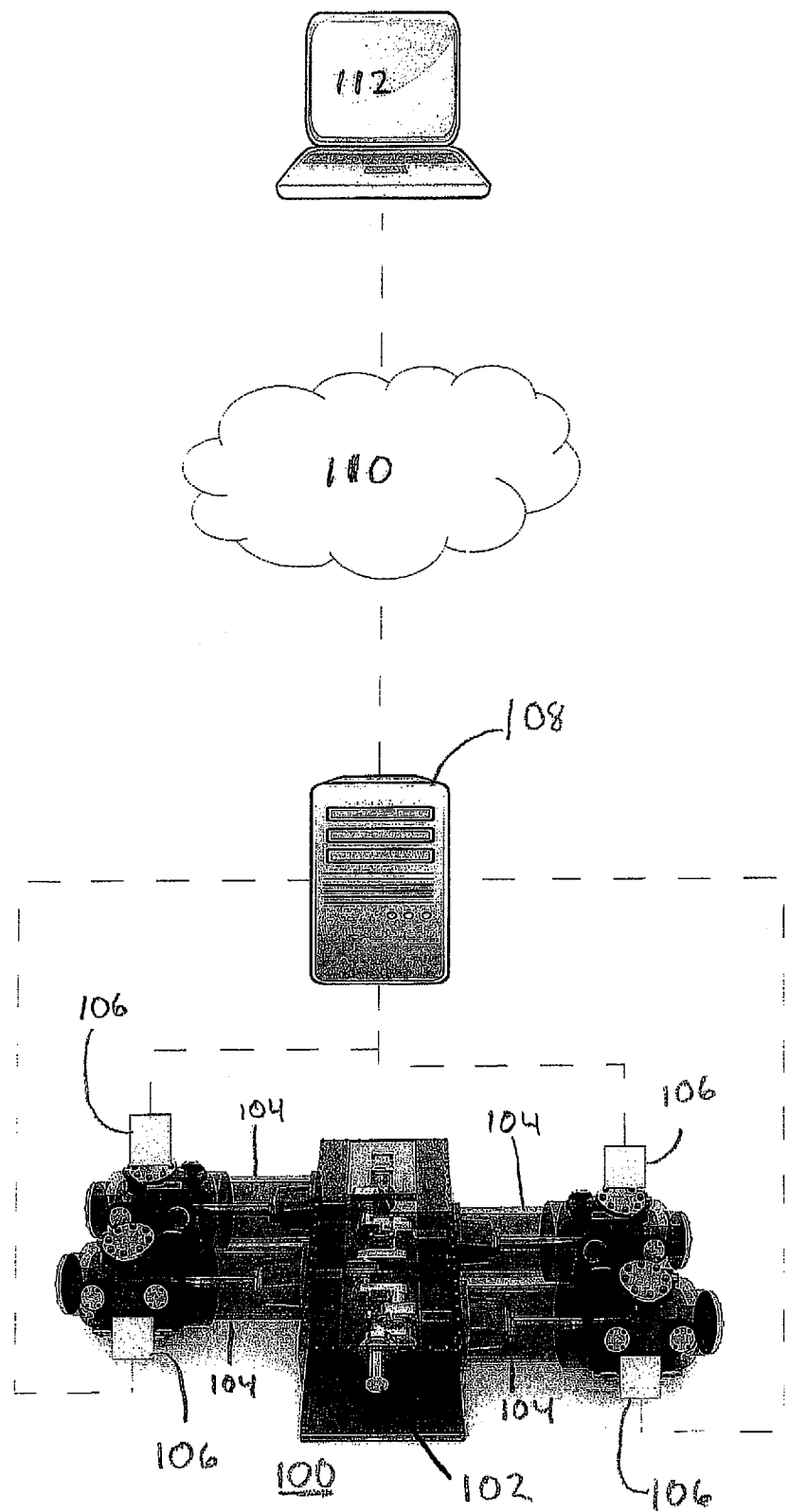
FIG. 1 shows a system diagram of a reciprocating machine having a plurality of sensors in accordance with the principles of the present invention.

For purposes of the description hereinafter, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

The presented technique can be used in multiple applications, and may be particularly beneficial in industries which routinely manage large fleets of large reciprocating machines. Potential applications include, but are not limited to: reciprocating compressors used in natural gas transportation, diesel, or spark ignited internal combustion engines, reciprocating compressors in chemical plants, engines in the power generation business, marine engines in cargo transportation vessels, hyper compressors for low density polyethylene (LDPE), hydraulic fracturing reciprocating pumps (frac pumps), mud pumps used in drilling operations, and any other reciprocating machinery.

Referring now to FIG. 1, in a preferred, non-limiting embodiment, at least one reciprocating machine 100 is provided having a crankshaft 102 and a plurality of cylinders 104. The reciprocating machine 100 may be a compressor used in the transfer of a gas such as natural gas, and the crankshaft 102 may be driven by an internal combustion engine or an electric motor (not shown), however it is to be understood that the present invention may be utilized with reciprocating machines driven by other means. Further, in non-limiting embodiments, the present invention may be utilized to monitor internal combustion engines themselves, which are, of course, reciprocating machines.

In the non-limiting embodiment shown, a sensor set 106 comprising an acoustic emission sensor, a magnetic pickup sensor, an accelerometer, a thermometer, and/or a pressure sensor is placed on each of the plurality of cylinders 104. Note that the accelerometer may also be referred to as a vibration sensor and is configured to provide the system with a vibration signal and that the acoustic emission sensor may also be referred to as an ultrasonic sensor.

The primary sensor utilized in a non-limiting embodiment of the present invention is an acoustic emission sensor. Acoustic emission sensors are piezoelectric devices that can capture the elastic waves generated by the internal impacts of the components in a reciprocating machine. The elastic waves that can be seen as sound waves that travel in the material of the reciprocating machine are the key to identify the internal condition of the machine. In non-limiting embodiments, the frequency ranges are relatively high and may have a range of 5 khz to 900 khz. Signs of problems or issues may particularly be detected in the high part of that frequency range, allowing to the system to potentially detect future machine problems before catastrophic failures may occur.

Accordingly, changes in the acoustic emission sensor signal can be related to changes in machine condition. One cycle in a reciprocating machine corresponds to one cycle of the crankshaft. Because of the cyclic nature of a reciprocating machine the acoustic waves that travel through its material should be statistically alike if the operating condition remains the same.

When problems with a machine arise, the machine often continues to work normally but the acoustic and/or vibration wave pattern changes, and this can allow the present system to present alarms and notifications to maintenance personnel before a failure occurs. These changes in the acoustic wave patterns can be subtle, and can be measured using acoustic emission sensors.

The sensors may be left on machine continuously or form part of a portable diagnostic kit for monitoring the machine periodically. It is to be appreciated that the present invention encompasses sensor sets that include only one or a subset of the aforementioned types of sensors. Further, it is to be appreciated that the present invention encompasses embodiments wherein each of the sensors is a separate entity that is not consolidated into one assembly as shown in FIG. 1.

In the non-limiting embodiment shown, each sensor set 106 comprises a magnet (not shown) that attaches the sensor assembly to the cylinder 104. However, any means of holding the a sensor or sensor set 106 in contact with a desired portion of the machine or in close proximity thereto is considered to be within the spirit of the claimed invention, and other configurations are envisioned including but not limited to connecting each sensor or sensor assembly to each cylinder using a harness, particularly a harness comprising a metal wire.

Figure 9:
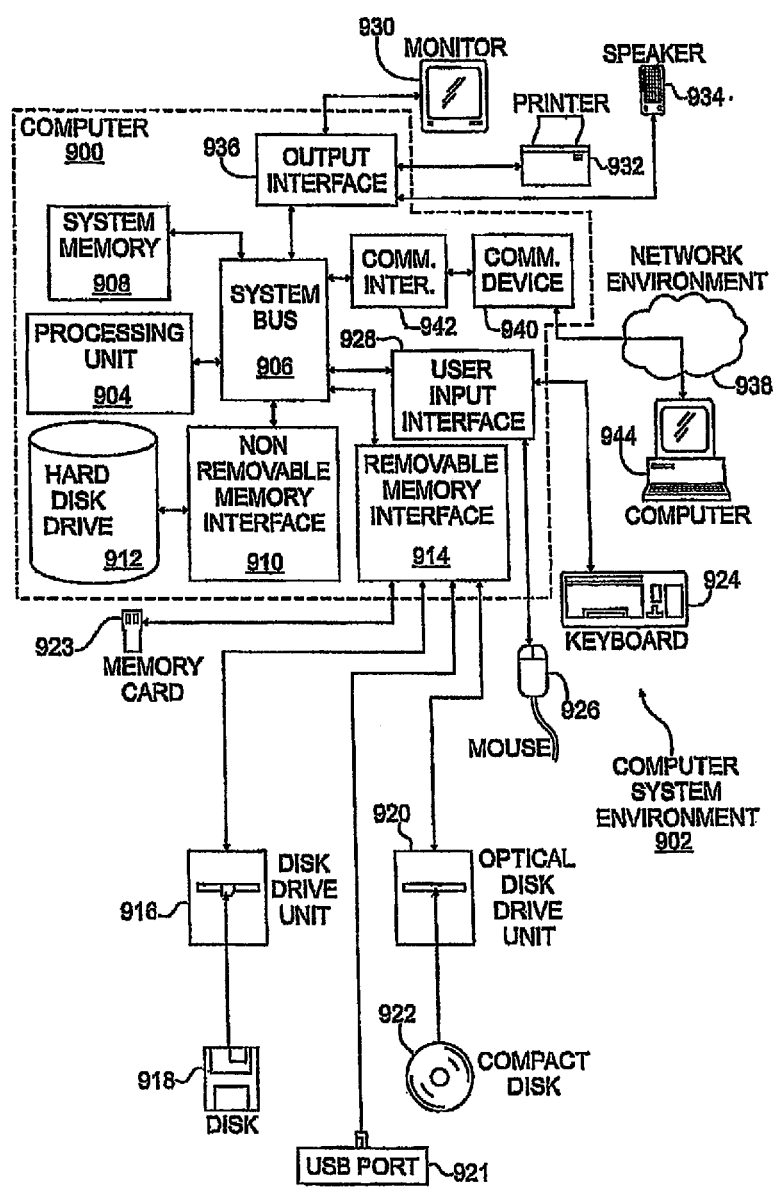
FIG. 9 illustrates a block diagram of a computer system in accordance with a non-limiting embodiment of the present invention.

In the preferred non-limiting embodiment shown, each sensor set 106 is in communication with at least one processor 108 which is further in communication with a computer 112 (see also 900 in FIG. 9) via a network 110 (see also 938 in FIG. 9). Preferably, each sensor has a unique identifier which indicates to the at least one processor 108 which cylinder the relevant data came from. The at least one processor 108 may comprise a data acquisition device (DAQ) comprising a data collector having a unique identifier that is used to recognize the data collector in the system and thus indicate from which of a plurality of processors the sampling data has originated.

The at least one processor is configured to determine an angular position of the crankshaft 102 based on data from the sensors. In a preferred non-limiting embodiment, the processor detects the acoustic, vibration, and/or magnetic signal from the sensor and determines the point at which the piston is fully extended within the cylinder (known as top-dead-center, or TDC) and assigns that position with a crank angle of 0. The other possible positions of the piston are understood to correspond with other potential crank angles from 0 to 360 degrees.

Figure 2:
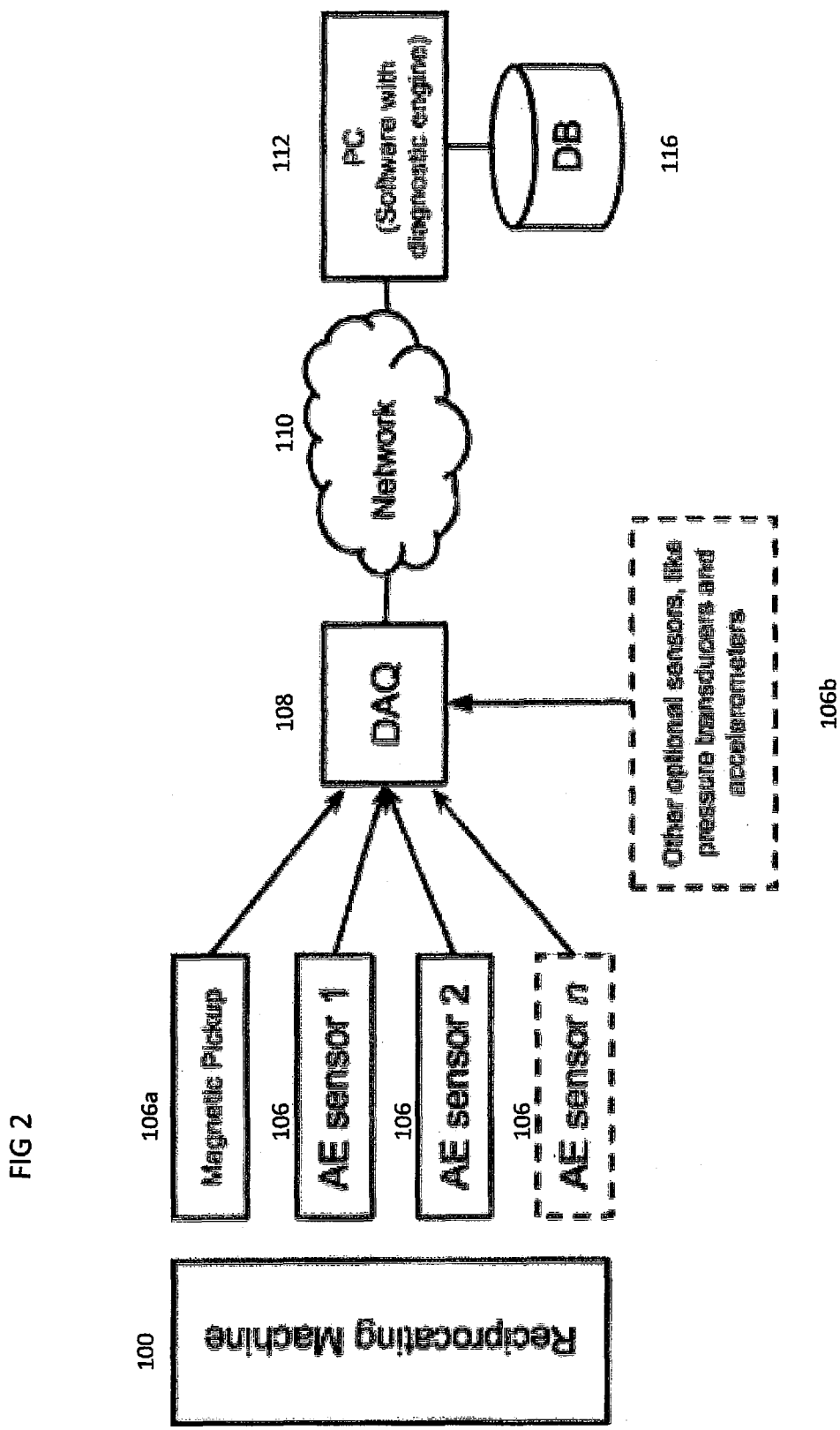
FIG. 2 shows a system diagram in accordance with a non-limiting embodiment of the present invention.

Referring now to FIG. 2, in a non-limiting embodiment, the DAQ 108 is in communication with a plurality of acoustic sensors 106 and a magnetic pickup sensor 106a and is configured to determine the time at which a TDC occurs. The acoustic emission sensors 106 communicate a high frequency signal that may be sampled at high speed using the DAQ ADC 302, 306. The DAQ 108 may also obtain data from additional sensors 106b such as accelerometers, thermometers, pressure sensors, etc. The DAQ 108 is further in communication with a computer 112 through a network 110.

Figure 3:
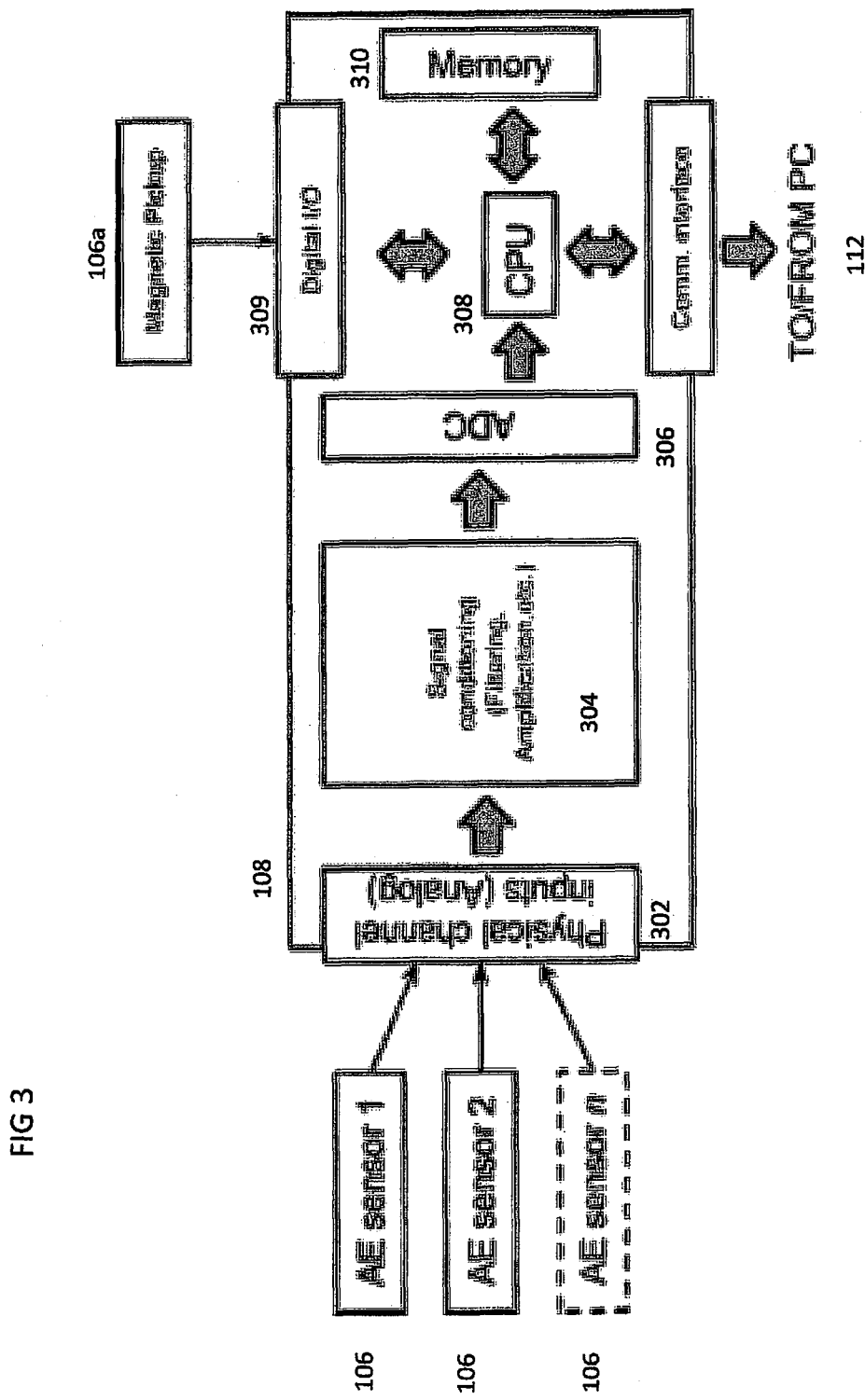
FIG. 3 shows an additional system diagram illustrating the operation of a data acquisition device (DAQ) in accordance with a non-limiting embodiment of the present invention.

Referring now to FIG. 3, in a non-limiting embodiment, at least one processor 108 may operate as follows. The sensor signals are received from the sensors through physical channel inputs 302, and passed through a signal conditioner, read by an analog-to-digital converter (ADC) 306, processed by a CPU 308. Additionally, signals from a magnetic pickup sensor 106a are sent to the CPU 308 through a separate digital input/output 309. The signals may be processed in the CPU 308 using a diagnostic engine and conditioning monitoring software and sent to a server computer 112 and/or to a memory 310.

Figure 4:
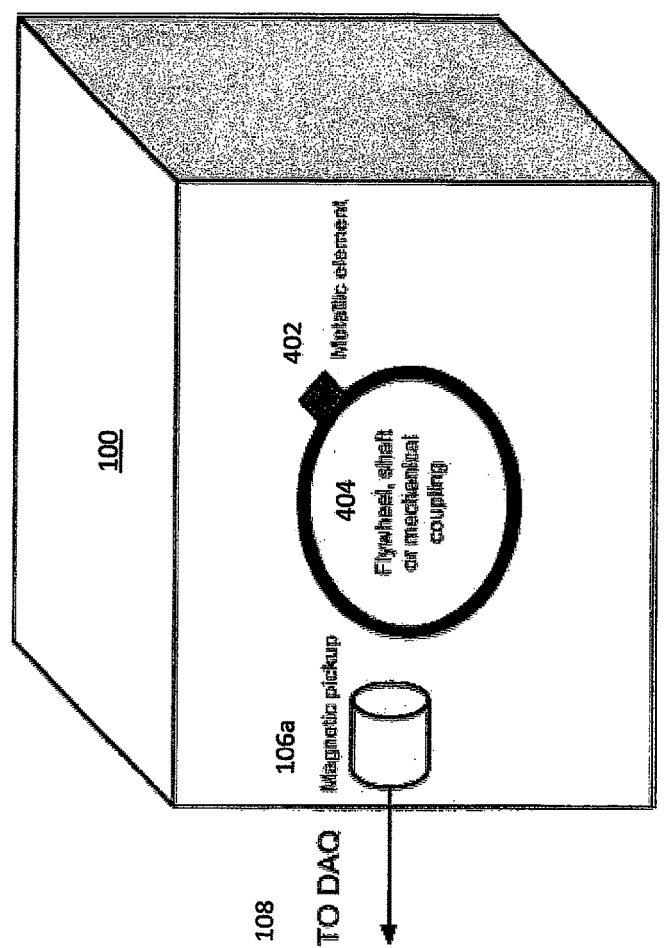
FIG. 4 depicts how a magnetic pickup sensor may be configured to interface with a reciprocating machine in accordance with a non-limiting embodiment of the present invention.
Figure 5:
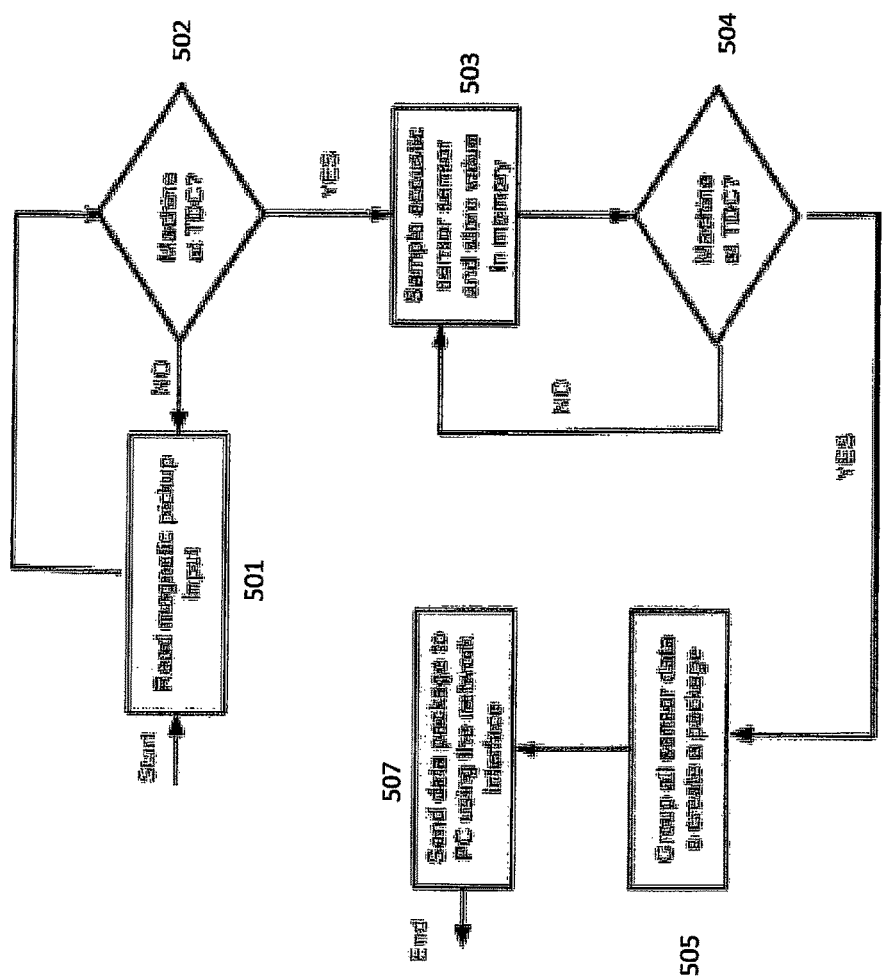
FIG. 5 shows a flow chart illustrating the process by which data from a magnetic pickup sensor may be analyzed and used to synchronize data from other sensors in accordance with a non-limiting embodiment of the present invention.

Referring now to FIG. 4, in a non-limiting embodiment, The ADC sampling process starts when the magnetic pickup sensor 106a detects the movement of a metallic element 402 of the machine 100 (step 501 in FIG. 5). When the metallic element 402 passes the sensor 106a it will generate a change in the normal voltage level of the magnetic pickup. In a preferred, non-limiting embodiment, the magnetic pickup 106a is installed such that one metallic element 402 is detected in one machine revolution. For example, one common component in reciprocating machines is the crankshaft, and attached to that is a flywheel, shaft, or any type of mechanical coupling. However, any such metallic element that can be detected in one revolution may be used as a signal to start the sampling process.

In a preferred non-limiting embodiment, the magnetic pickup sensor 106a is placed in a position near the path of the metallic element 402 that corresponds to the TDC of a cylinder selected for analysis. In a multi-cylinder reciprocating machine, pistons may reach TDC simultaneously or at different times depending on the configuration. Accordingly, in non-limiting embodiments configured to analyze reciprocating machines having multiple cylinders wherein the TDC of all cylinders is not reached at the same time, there may either be a plurality of magnetic pickups 106a associated with each cylinder of interest, and/or the at least one processor 108 may be configured to determine the TDC of each cylinder to be analyzed based on the TDC of one cylinder and a known reciprocating machine configuration. In further non-limiting embodiments, the DAQ 108 or computer 112 may be configured to determine the TDC of each cylinder to be analyzed based on the location of the metallic element 402 at a given point in a cycle of the reciprocating machine and a known engine configuration.

FIG. 5 illustrates the magnetic pickup data analysis process in greater detail in accordance with a non-limiting embodiment of the present invention. When the system is brought online, in step 501, the DAQ 108 receives signals from the magnetic pickup sensor 106a and determines when a TDC occurs 502. When the piston reaches TDC, signals from the acoustic sensors, or in some embodiments, additionally, vibration, temperature, and/or pressure signals, are received by the DAQ 108 and stored in the device memory 310 in step 503. When the DAQ 108 determines that a next TDC event has occurred 504, data from each of the sensors 106 for that cycle are assembled in a package 505 and the package 505 is sent to the server computer 112 via the network 110. A plurality of such samples for each sensor may be measured and analyzed, and this process may be repeated for each sensor connected to the DAQ 108, and statistical analysis may be conducted.

After the computer 112 receives the data from sensors 106 it passes the data through the diagnostic engine, and the signals from the various sensors may be ordered such that the first element is the first value sampled by the ADC in the DAQ 108, and the last element is the last value sampled, in accordance with the cycle of the reciprocating machine.

The at least one processor 108 may be further configured to identify a plurality of segments of potential crankshaft angular positions at regular intervals from 0 to 360 degrees. Because the signal is synchronized with the machine revolution, (for example, as described in FIG. 4) the diagnostic software starts by splitting the signal captured by the DAQ in sections of the same size, that sections could be 2.5°, 5°, 10°, or any number less than 360 degrees. For example, a single data reading of any sensor may be divided into 36 sections of 10 degrees, 72 sections of 5 degrees, or 144 sections of 2.5 degrees that represent one cycle of the crankshaft, however any interval may be permissible. The data read is thereby synchronized with the cycles of the crankshaft. The idea behind this approach is to focus the data analysis in specific moments of the reciprocating cycle, these moments could include, for instance, suction valve opening or suction valve closing in a cylinder.

In non-limiting embodiments configured for analyzing machines having multiple cylinders, the above-mentioned analysis may optionally be conducted based on multiple rotations of the crankshaft and the at least one processor 108 may be further configured to identify a plurality of segments of potential crankshaft angular positions at regular intervals from 0 to 720, 1080, or 1440 degrees, or any other multiple of 360 degrees. This allows for analysis of the operating condition of each cylinder at each unique piston configuration within the reciprocating machine.

The processor may be further configured to select a subset of potential crankshaft angular positions for specific analysis, either automatically or in response to a user command. The subset may comprise one section as described above or a plurality of adjacent sections.

One or more statistics such as a root mean square (RMS) value, a peak value, and/or a peak-to-peak value associated with each selected subset of possible crankshaft angular positions may be calculated based at least partially on data from the relevant sensor(s). Preferably, the statistics chosen are of a type that are usually correlated to the energy level in a compressor.

At least one, and preferably every, section of the cycle may have one or more fixed thresholds that are calculated using a percentage of tolerance for the energy contained in that specific part of the cycle. The percentage value may be established by the user or automatically selected by the system based on previously read data that is considered normal or good. Alternatively, the percentage value may be selected arbitrarily or based on a predicted tolerance for the machine to be measured.

Particularly for acoustic and vibration sensors, the preferred, but not limiting statistic used for the selected subset is an RMS because this normalizes these varying quantities into single measurements, which can more easily be analyzed. Statistically significant change in the RMS value across a selected crank angle segment over time may indicate potential future problems in the reciprocating machine.

In a preferred non-limiting embodiment, the diagnostic software uses a set of predefined thresholds using a baseline RMS value established when the machine is known to be operating normally, and these RMS values for each segment are stored in a database and used to make future comparisons with future captured sensor signals.

In a preferred, non-limiting embodiment, the thresholds are calculated using known statistical analysis equations to determine whether current RMS value, or other statistic for a given angle segment is significantly different from the baseline value. For example, each threshold may be established at least partially using a two sample T-test utilizing an Ensemble Classifier, such as a single-feature binary classifier, and a Weighted Voting Method may be used to make a final determination as to whether a threshold has been exceeded.

Each threshold establishes a limit that can indicate warnings or errors if it is exceeded, and the user can create a diagnostic based on the thresholds exceeded in specific sections. In a preferred non-limiting embodiment, the system is configured to provide the user with a unique warning corresponding to the specific threshold that has been exceeded. The warning may be communicated to a computer (900 in FIG. 5) or other mobile device having a user interface, and may be in any form sufficient to alert a user, to include an audible warning and/or a visual indication on a user interface. Additionally or alternatively, the system may automatically shut down the machine if one or more predetermined thresholds is exceeded.

If one of the current RMS section calculations significantly exceeds the value calculated for the good known mechanical condition, then an indication or alarm may be communicated to the user, for example, via a human-machine interface (HMI) or by email. Other protocols which may be utilized in communicating the alarms or communications include systems such as OPC-UA or Modbus.

Note that the good known mechanical condition of a machine may change based on the operating condition of the machine. For example, if the operator of the machine increases the RPM, load, throttle, or other parameter, the expected signals for a good known operating condition will change because the energy and forces that act inside the reciprocating machine will change. For example, the acoustic waves, engine vibration, temperature, and pressure will normally increase in amplitude if the machine load increases. Accordingly, in a preferred non-limiting embodiment of the present invention, the system is calibrated based on known changes in operating condition of the reciprocating machine such that there is a different set of thresholds associated with each operating condition.

Figure 6:
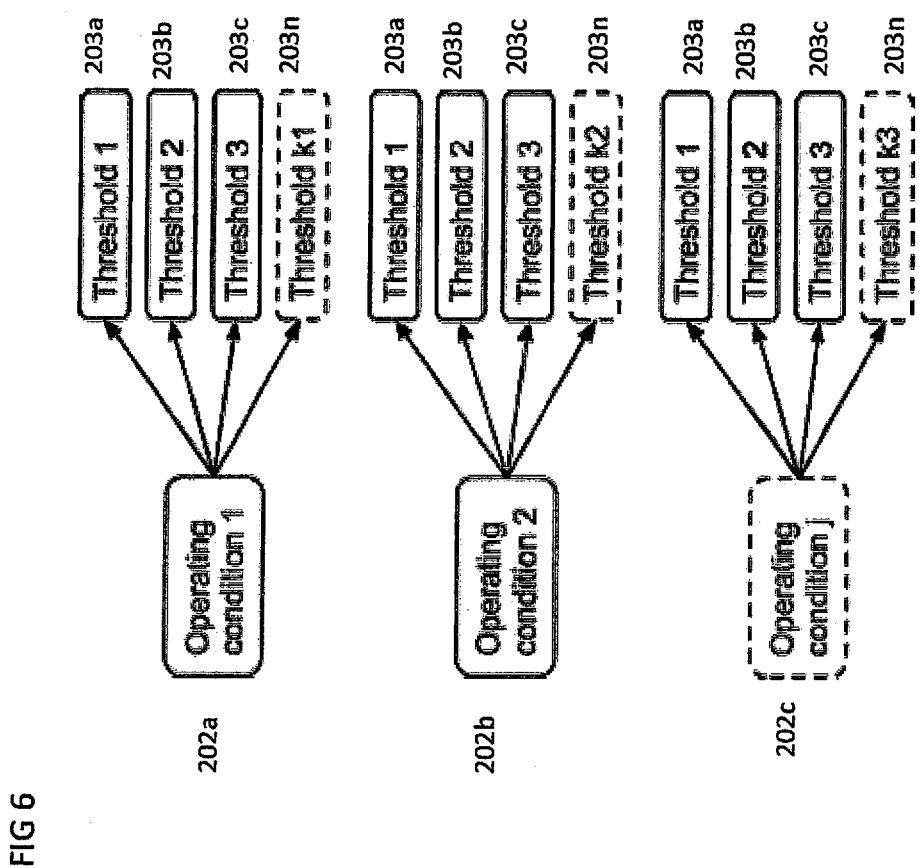
FIG. 6 is a chart illustrating a way in which a plurality of thresholds may be ordered in accordance with a non-limiting embodiment of the present invention.

FIG. 6 illustrates this process in accordance with a non-limiting embodiment of the present invention. Based on a known or predetermined status of the machine, either the user manually selects, or at least one processor automatically determines a current operating condition 202*a, b, c* of the machine. For example, 202*a* could mean idling, 202*b* could be normal operation, and 202*c* could be near-maximum work output, however, other arrangements are also deemed within the spirit of the present invention, and non-limiting embodiments are permissible wherein any number of operating conditions may be utilized. Each operating condition may be assigned its own set of thresholds 203*a, b, c*, and these thresholds may be utilized in the statistical analysis and alarms generation process associated with that operating condition. In such embodiments, choosing the correct operating condition helps to avoid false positive alarms. Note that the selection of discrete operating conditions is considered to be an optional feature. For example, in an alternative non-limiting embodiment, the at least one processor may be further configured to compare the machine RPM, load, throttle, or other parameter with the signal output such that the change in operating condition may be automatically accounted for in the statistical analysis and alarms generation process.

Depending on the machine geometry and characteristics, the diagnostic engine can use a set of thresholds and relate the thresholds to different types of machine components. The historical raw sensor data of machine readings may be stored in a database for future analysis.

Figure 7A:
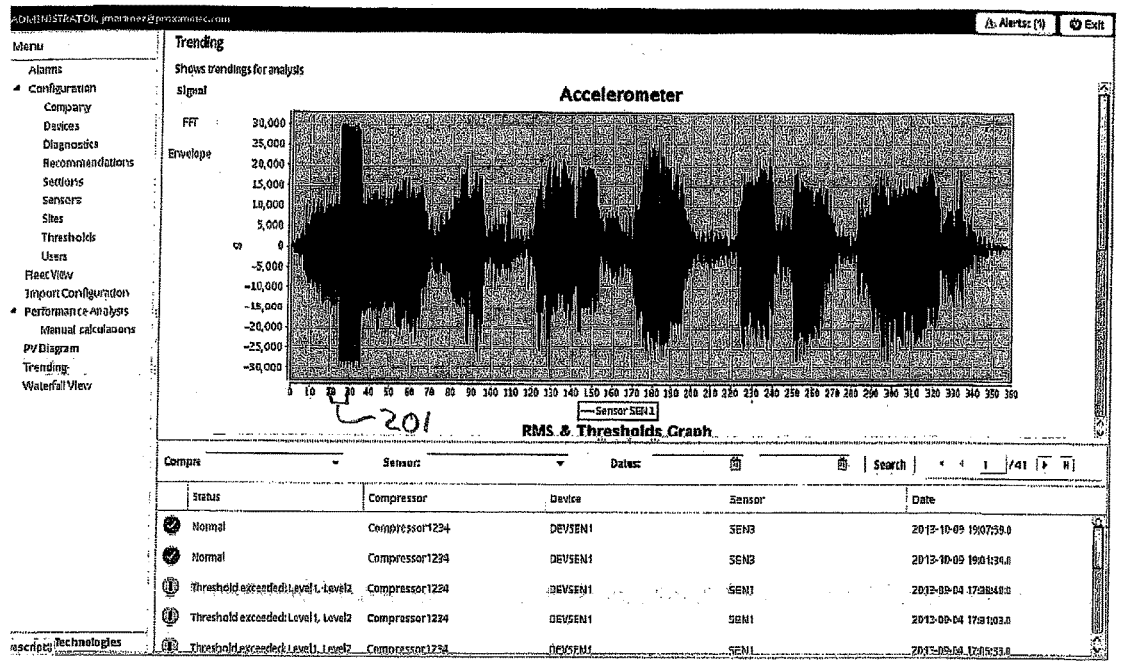
FIGS. 7a-c depict examples of graphs which may be provided on a user interface in accordance with a non-limiting embodiment of the present invention. In the non-limiting example shown, the graphs are based on data from an accelerometer.
Figure 7B:
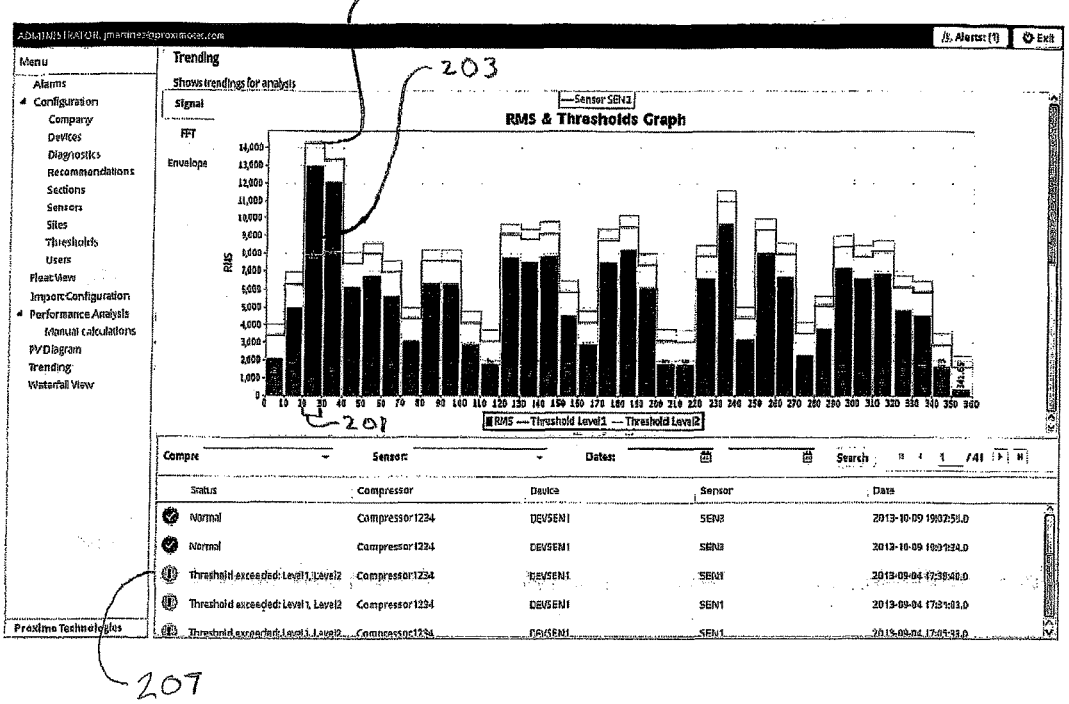
Figure 7C:
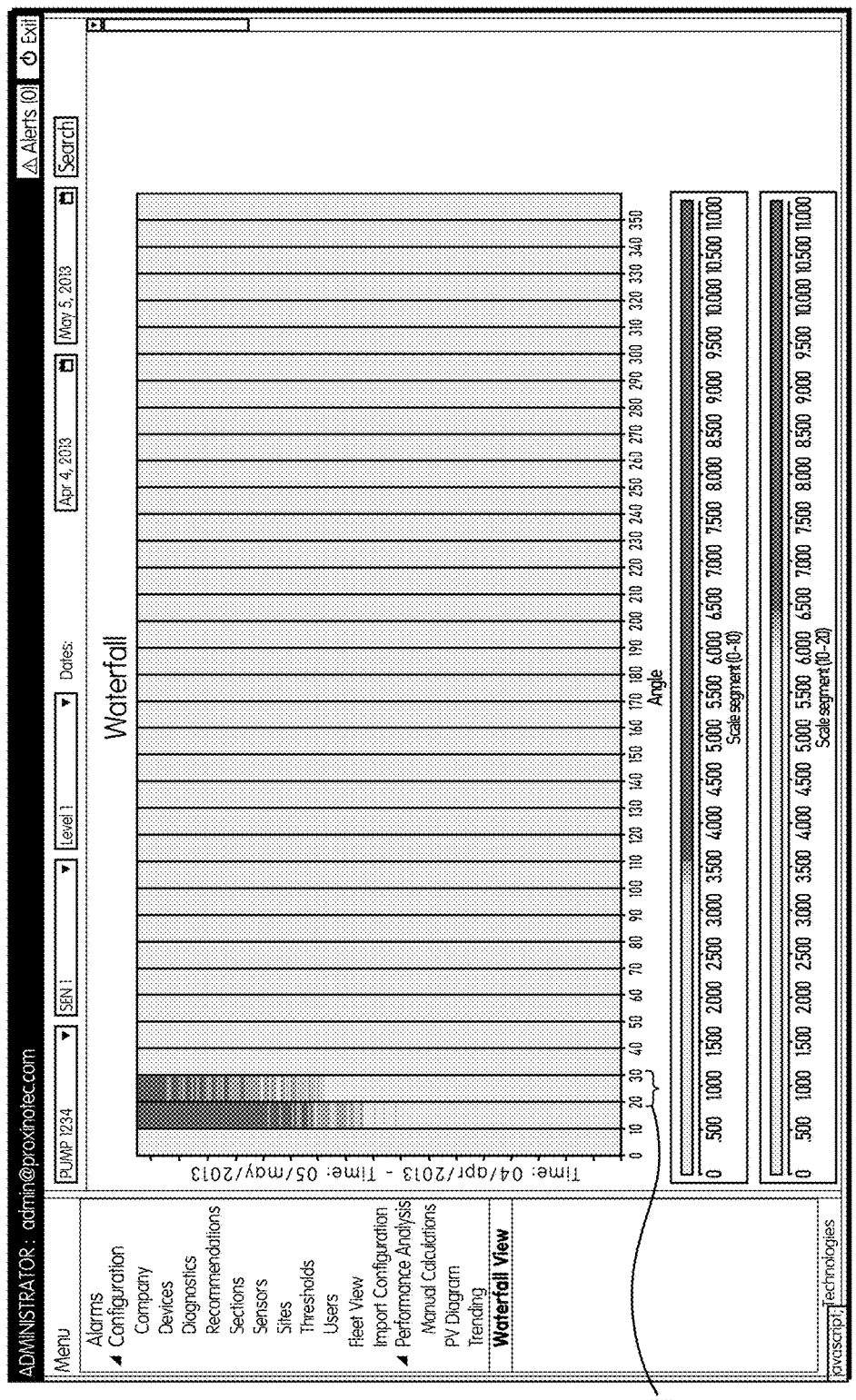

The preceding description will be understood more fully with reference to the non-limiting example shown in FIGS. 7*a-c*.

FIG. 7*a* depicts the raw sensor data from an accelerometer as it may be displayed on the user interface at a preselected operating condition in accordance with a non-limiting embodiment of the present invention. The X-axis represents the crankshaft angular position divided into 10 degree segments from 0 to 360 degrees, and the Y-axis represents the magnitude of the vibration signal. Note that because the acoustic emission signals are a similarly varying quantity, the following example may apply to data from acoustic emission sensors as well. A subset 201 of potential crankshaft angular positions between 20 and 30 degrees has been selected by way of example to facilitate understanding of the non-limiting embodiment shown.

FIG. 7*b* shows a graph based on the raw data shown in FIG. 7*a* wherein the X-axis still represents the crankshaft angular position, divided into 10 degree segments from 0 to 360 degrees, while the Y-axis represents the root mean square (RMS) values of the acoustic emission signals of the 10 degree angle segments.

In the non-limiting embodiment shown, each segment is provided with a first threshold 203 and a second threshold 205. The system is configured to provide the user with a warning specific to each segment based on the highest threshold that has been exceeded. By way of example, in subset 201, the first threshold 203 has been exceeded, but the second threshold 205 has not. Accordingly, a yellow warning 207 has been provided to the user indicating that the second threshold 205 has been exceeded.

In a preferred, non-limiting embodiment, the system may be further configured to track the condition of the valve at a specific angle segment over time. By way of example, referring now to FIG. 7*c*, which is also based on the raw data from FIG. 7*a*, the X-axis still represents the crankshaft angular position, divided into 10 degree segments from 0 to 360 degrees, while the Y-axis represents time. A gradient, which is a function of how far or how often a threshold has been exceeded, acts like a Z-axis and is used to represent the condition of the valve at each segment. In the non-limiting embodiment shown, the gradient is a green-to-yellow-to-red color scale, but any gradient may be used, including, but not limited to, any other type of color gradient, a light to dark value gradient, letters, numbers, or symbols which are assigned to various valve conditions, or any combination thereof.

In a preferred non-limiting embodiment, each diagnostic has a set of recommendations generated by the user associated that are directly related to the level of the thresholds, such that the exceeded thresholds in a section with a possible diagnostic. The recommendations are the possible actions to take when a diagnostic is generated.

In a preferred non-limiting embodiment, the system is configured to monitor a plurality of compressors 100 at remote locations and provide the user with an indication as to the location of any problems via a network. The data generated from the sensors may be captured and packaged to send to the server using a network communication interface, including but not limited to an internet connection, wireless communications, LAN, satellite link, or any kind of private long distance network.

Referring now to FIG. 8*a*, in the non-limiting embodiment shown, the data from the compressors is maintained and managed on a customer local network 111. Each of a plurality of compressors or other reciprocating machines 100 is in communication with a data collector 108. The plurality of data collectors 108 are in communication with the user interface 112 via an application server 114. Data from the compressors 100 may be stored in a mail server 118 or in a storage database 116.

Referring now to FIG. 8b, in the non-limiting embodiment shown, the customer local network 111 comprises a plurality of data collectors 108, and the relevant data is communicated via the internet 110 and stored and managed in a cloud-based system 113. Each of a plurality of compressors or other reciprocating machines 100 is in communication with a data collector 108. The plurality of data collectors 108 are in communication with the user interface 112 via the internet 110. Data from the compressors 100 may be managed in an application server 114 and stored in a mail server 118 or in a storage database 116. For security reasons, a firewall 120 is preferably included in such embodiments to protect the application server 114 and databases.

In a preferred non-limiting embodiment, alarms or notifications are generated when at least one sensor threshold has been exceeded. Optionally, the alarm includes the information of the compressor that generates the notification, the generation date, and a short description that indicates the quantity of thresholds exceeded. Such warnings or alarms may be communicated to a user via a network as shown in FIG. 8a or 8b above and displayed on a user interface 112.

In a further preferred non-limiting embodiment, each compressor is associated with a logical or physical location to be managed by the system, such as, but not limited to, a location in a gas pipeline, a location in a drilling rig, or any other such feature that indicates a compressors group. Each compressor may be equipped with a global positioning system device in communication with the system, or the site location may be programed into the system by the user.

In a preferred non-limiting embodiment, the warnings provide the user with one or more of: the location of the compressor wherein a threshold has been exceeded, the identity of the compressor wherein a threshold has been exceeded, the identity of the cylinder in which the threshold has been exceeded, and the identity of the angle segment in which the threshold has been exceeded. In this way, the invention may enable a user to effectively manage a large fleet of compressors by providing the user with highly specific information about the location and nature of any problems that have been detected.

Aspects of the present invention including but not limited to data processing, data analysis, and the communication of warnings, indications, or other information to a user may be implemented on a variety of computing devices and systems, wherein these computing devices include the appropriate processing mechanisms and computer-readable media for storing and executing computer-readable instructions, such as programming instructions, code, and the like.

As shown in FIG. 9, personal computers 900, 944, in a computing system environment 902 are provided. This computing system environment 902 may include, but is not limited to, at least one computer 900 having certain components for appropriate operation, execution of code, and creation and communication of data. For example, the computer 900 includes a processing unit 904 (typically referred to as a central processing unit or CPU) that serves to execute computer-based instructions received in the appropriate data form and format. Further, this processing unit 904 may be in the form of multiple processors executing code in series, in parallel, or in any other manner for appropriate implementation of the computer-based instructions.

In order to facilitate appropriate data communication and processing information between the various components of the computer 900, a system bus 906 is utilized. The system bus 906 may be any of several types of bus structures, including a memory bus or memory controller, a peripheral bus, or a local bus using any of a variety of bus architectures. In particular, the system bus 906 facilitates data and information communication between the various components (whether internal or external to the computer 900) through a variety of interfaces, as discussed hereinafter.

The computer 900 may include a variety of discrete computer-readable media components. For example, this computer-readable media may include any media that can be accessed by the computer 900, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, this computer-readable media may include communications media, such as computer-readable instructions, data structures, program modules, or other data in a modulated data signal, such as a carrier wave or other transport mechanism and include any information delivery media, wired media (such as a wired network and a direct-wired connection), and wireless media (such as acoustic signals, radio frequency signals, optical signals, infrared signals, biometric signals, bar code signals, etc.). Of course, combinations of any of the above should also be included within the scope of computer-readable media.

The computer 900 further includes a system memory 908 with computer storage media in the form of volatile and non-volatile memory, such as ROM and RAM. A basic input/output system (BIOS) with appropriate computer-based routines assists in transferring information between components within the computer 900 and is normally stored in ROM. The RAM portion of the system memory 908 typically contains data and program modules that are immediately accessible to or presently being operated on by processing unit 904, e.g., an operating system, application programming interfaces, application programs, program modules, program data, and other instruction-based computer-readable codes.

With continued reference to FIG. 9, the computer 900 may also include other removable or non-removable, volatile or non-volatile computer storage media products. For example, the computer 900 may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD ROM), a Universal Serial Bus (USB) port 921 for use in connection with a removable memory card, etc. However, it is envisioned that other removable or non-removable, volatile or non-volatile computer storage media can be used in the exemplary computing system environment 900, including, but not limited to, magnetic tape cassettes, DVDs, digital video tape, solid state RAM, solid state ROM, etc. These various removable or non-removable, volatile or non-volatile magnetic media are in communication with the processing unit 904 and other components of the computer 900 via the system bus 906. The drives and their associated computer storage media discussed above and illustrated in FIG. 9 provide storage of operating systems, computer-readable instructions, application programs, data structures, program modules, program data, and other instruction-based computer-readable code for the computer 900 (whether duplicative or not of this information and data in the system memory 908).

A user may enter commands, information, and data into the computer 900 through certain attachable or operable input devices, such as a keyboard 924, a mouse 926, etc., via a user input interface 928. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication to the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby, forming a specialized and particular computing system. Accordingly, the presently-invented method and system may include one or more computers 900 or similar computing devices having a computer-readable storage medium capable of storing computer-readable program code or instructions that cause the processing unit 902 to execute, configure, or otherwise implement the methods, processes, and transformational data manipulations discussed hereinafter in connection with the present invention. Still further, the computer 900 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

It will be apparent to one skilled in the relevant art(s) that the system may utilize databases physically located on one or more computers which may or may not be the same as their respective servers. For example, programming software on computer 900 can control a database physically stored on a separate processor of the network or otherwise.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A method for monitoring at least one reciprocating machine having a crankshaft and at least one cylinder, comprising the steps of:
   providing at least one magnetic pickup sensor for monitoring a movable metallic component of the at least one reciprocating machine, the at least one magnetic pickup sensor being in communication with at least one processor configured to determine an angular position of the crankshaft based on data received from the magnetic pickup sensor;
   providing at least one sensor for monitoring the at least one cylinder, the sensor being in communication with at least one processor configured to measure at least one signal from the at least one sensor;
   selecting at least one subset of potential crankshaft angular positions;
   calculating at least one statistic associated with the at least one subset of possible crankshaft angular positions based at least partially on data from the at least one sensor; and
   generating an indication regarding how often the at least one statistic exceeded at least one predetermined threshold during a monitoring period;
   wherein the at least one sensor comprises at least one piezoelectric acoustic emission sensor configured to detect sound waves that travel in the material of the at least one reciprocating machine;
   wherein the indication comprises a change in a gradient of a representation on a user interface associated with the at least one subset of possible crankshaft angular positions for a predetermined valve.

2. The method of claim 1, wherein the at least one statistic comprises at least one of the following:
   a peak value, a peak to peak value, a root mean square value, or any combination thereof of an acoustic emission or vibration signal associated with at the least one subset of potential crankshaft angular positions.

3. The method of claim 1, wherein a plurality of segments of potential crankshaft angular positions are identified at regular intervals from 0 to 360 degrees, and the at least one subset of potential crankshaft angular positions consists of one or more of the identified segments.

4. The method of claim 3, wherein the at least one warning comprises an indication as to in which of the plurality of identified segments the at least one threshold has been exceeded.

5. The method of claim 1, wherein the at least one threshold is determined by:
   determining a baseline signal for the at least one subset of potential crankshaft angular positions by measuring the at least one signal when the machine is known to be operating normally; and
   conducting statistical analysis to determine whether the at least one signal is significantly different than the baseline signal.

6. The method of claim 1, wherein:
   the at least one predetermined threshold comprises a plurality of thresholds; and
   the at least one warning comprises a plurality of different warnings associated with each of the predetermined thresholds.

7. The method of claim 6, further comprising:
   displaying the at least one warning on a computer or mobile device having a user interface, wherein:
   each of the plurality of thresholds is assigned a color; and
   the at least one warning comprises changing a color of an indicator on the user interface to the color associated with the most significant of the plurality of thresholds that has been exceeded.

8. The method of claim 1, wherein:
   the at least one sensor comprises a plurality of sensors, each sensor being associated with one of a plurality of cylinders of the machine, and the at least one processor is further configured to indicate which of the plurality of cylinders wherein a threshold has been exceeded.

9. The method of claim 1, wherein:
   the at least one reciprocating machine comprises a plurality of machines at remote locations, and the at least one processor is further configured to indicate in which of the plurality of machines wherein a threshold has been exceeded, and wherein:
   at least two of the plurality of machines comprise geographic information systems;
   the warning is communicated via at least one network to at least one computer or mobile device having a user interface; and
   the user is provided with an indication as to the location of the reciprocating machine wherein a threshold has been exceeded.

10. A system for monitoring at least one reciprocating machine having a crankshaft and at least one cylinder, comprising:
    at least one magnetic pickup sensor for monitoring a movable metallic component of the at least one reciprocating machine, the at least one magnetic pickup sensor being in communication with at least one processor configured to determine an angular position of the crankshaft based on data received from the magnetic pickup sensor;
    at least one sensor for monitoring the at least one cylinder, the sensor being in communication with at least one processor configured to measure at least one signal from the at least one sensor; and
    at least one computer configured to, either automatically or in response to a user commend, select at least one subset of potential crankshaft angular positions, calculate at least one statistic associated with the at least one subset of possible crankshaft angular positions based least partially on data from the at least one sensor, and communicate to a user an indication regarding how often the at least one statistic exceeded at least one predetermined threshold during a monitoring period;
    wherein the at least one sensor comprises at least one piezoelectric acoustic emission sensor configured to detect sound waves that travel in the material of the at least one reciprocating machine;
    wherein the indication comprises a change in a gradient of a representation on a user interface associated with the at least one subset of possible crankshaft angular positions for a predetermined valve.

11. The system of claim 10, wherein the at least one statistic comprises at least one of the following:
    a peak value, a peak to peak value, a root mean square value, or any combination thereof of an acoustic emission or vibration signal associated with at the least one subset of potential crankshaft angular positions.

12. The system of claim 10, wherein the at least one computer is further configured to identify a plurality of segments of potential crankshaft angular positions at regular intervals from 0 to 360 degrees, and the at least one subset of potential crankshaft angular positions consists of one or more of the identified segments.

13. The system of claim 12, wherein the at least one warning comprises an indication as to in which of the plurality of identified segments the at least one threshold has been exceeded.

14. The system of claim 10, wherein the at least one threshold is determined by:
    determining a baseline signal for the at least one subset of potential crankshaft angular positions by measuring the at least one signal when the machine is known to be operating normally; and
    conducting statistical analysis to determine whether the at least one signal is significantly different than the baseline signal.

15. The system of claim 10, wherein:
    the at least one predetermined threshold comprises a plurality of thresholds; and
    the at least one warning comprises a plurality of different warnings associated with each of the predetermined thresholds.

16. The system of claim 15, wherein:
    the at least one computer is further configured to display the at least one warning on a user interface, wherein:
    each of the plurality of thresholds is assigned a color; and
    the at least one warning comprises changing a color of an indicator on the user interface to the color associated with the most significant of the plurality of thresholds that has been exceeded.

17. The system of claim 10, wherein:
    the at least one sensor comprises a plurality of sensors, each sensor being associated with one of a plurality of cylinders of the machine, and the at least one processor is further configured to indicate which of the plurality of cylinders wherein a threshold has been exceeded.

18. The system of claim 10, wherein:
    the at least one reciprocating machine comprises a plurality of machines at remote locations, and the at least one processor is further configured to indicate in which of the plurality of machines wherein a threshold has been exceeded, and wherein:
    at least two of the plurality of machines comprise geographic information systems;

the warning is communicated via at least one network to at least one computer or mobile device having a user interface; and the user is provided with an indication as to the location of the reciprocating machine wherein a threshold has been exceeded.

19. The method of claim 1, wherein the indication comprises a change in a gradient of a representation on a user interface associated with the at least one subset of possible crankshaft angular positions for a predetermined valve.

20. The method of claim 10, wherein the indication comprises a change in a gradient of a representation on a user interface associated with the at least one subset of possible crankshaft angular positions for a predetermined valve.

* * * * *

UNITED STATES PATENT AND TRADEMARK OFFICE
CERTIFICATE OF CORRECTION

| | | |
|---|---|---|
| PATENT NO. | : 9,959,738 B2 | Page 1 of 1 |
| APPLICATION NO. | : 14/779430 | |
| DATED | : May 1, 2018 | |
| INVENTOR(S) | : Michael Boken | |

It is certified that error appears in the above-identified patent and that said Letters Patent is hereby corrected as shown below:

On the Title Page

Column 1, Line 3, delete "days. days." and insert -- days. --

In the Claims

Column 16, Line 2, Claim 10, before "least" insert -- at --

Column 17, Line 11, Claim 20, delete "method" and insert -- system --

Signed and Sealed this
Twenty-fourth Day of July, 2018

Andrei Iancu
*Director of the United States Patent and Trademark Office*